(12) United States Patent
Tian et al.

(10) Patent No.: US 12,518,433 B2
(45) Date of Patent: Jan. 6, 2026

(54) LEARNING-BASED POINT CLOUD COMPRESSION VIA TEARING TRANSFORM

(71) Applicant: InterDigital Patent Holdings, Inc., Wilmington, DE (US)

(72) Inventors: Dong Tian, New York, NY (US); Jiahao Pang, New York, NY (US); Maurice Quach, Gif-sur-Yvette (FR); Giuseppe Valenzise, Gif-sur-Yvette (FR); Frederic Dufaux, Gif-sur-Yvette (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 154 days.

(21) Appl. No.: 18/556,401

(22) PCT Filed: Apr. 29, 2022

(86) PCT No.: PCT/US2022/026990
§ 371 (c)(1),
(2) Date: Oct. 20, 2023

(87) PCT Pub. No.: WO2022/232547
PCT Pub. Date: Nov. 3, 2022

(65) Prior Publication Data
US 2024/0193819 A1 Jun. 13, 2024

Related U.S. Application Data

(60) Provisional application No. 63/181,270, filed on Apr. 29, 2021.

(51) Int. Cl.
*G06T 9/00* (2006.01)
*G06T 17/00* (2006.01)

(52) U.S. Cl.
CPC .............. *G06T 9/002* (2013.01); *G06T 17/00* (2013.01); *G06T 2210/56* (2013.01)

(58) Field of Classification Search
CPC ...... G06T 9/002; G06T 17/00; G06T 2210/56
(Continued)

(56) References Cited

U.S. PATENT DOCUMENTS

2019/0075320 A1  3/2019  Mammou et al.
2020/0045289 A1*  2/2020  Raziel .................... G06N 5/046
(Continued)

OTHER PUBLICATIONS

Pang et al., "TearingNet: Point Cloud Autoencoder to Learn Topolgy-Friendly Representations", 2021 IEEE/CVF Conference Computer Vision and Pattern Recognition (CVPR), arXiv:2006.10187v3, [cd.CV], Apr. 1, 2021, pp. 1-10.
(Continued)

*Primary Examiner* — David T Welch
(74) *Attorney, Agent, or Firm* — Xiaoan Lu

(57) ABSTRACT

In one implementation, a learnable transformation TearingTransform over 3D point cloud data is proposed. The TearingTransform could decompose point clouds into two channels: a low rank channel and a sparse channel. The low rank channel corresponds to a codeword representing a rough shape of a point cloud. The sparse channel appears as an image-like data representing residual information that can refine the reconstructed point locations. In an encoder based on TearingTransform, a PN module is used to generate the codeword from the input point cloud; a FN module is used to reconstruct a preliminary point cloud from the codeword and an initial grid image; and a TN module modifies the initial grid image to generate an adjusted grid image. The codeword and the adjusted grid image are compressed. At the decoder, the point cloud can be reconstructed based on the decompressed codeword and adjusted grid image.

16 Claims, 13 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2021/0099701 A1* | 4/2021 | Tourapis | H04N 19/60 |
| 2022/0005232 A1* | 1/2022 | Harviainen | G06T 9/002 |
| 2022/0051446 A1* | 2/2022 | Rhyu | G06T 3/06 |
| 2022/0351421 A1* | 11/2022 | Oh | G06T 9/40 |

OTHER PUBLICATIONS

Yang et al., "FoldingNet: Point Cloud Auto-Encoder via Deep Grid Deformation", Institute of Electrical and Electronics Engineering (IEEE), 2018 IEEE/CVF Conference on Computer Vision and Pattern Recognition, Salt Lake City, UT, USA, Jun. 18, 2018, 10 pages.

Quach et al., "Folding-Based Compression of Point Cloud Attributes", 2020 IEEE International Conference On Image Processing (ICIP), IEEE, Oct. 25, 2022, pp. 1-6.

Groueix et al., "AtlasNet: A Papier-Mache Approach to Learning 3D Surface Generation", arxiv.org, Cornell University Library, 201 Olin Library Cornell University Ithaca, NY 14853, arXiv:1802. 05384v3 [cs.CV] Jul. 20, 2018.

MEPG 3DG, "G-PCC codec description v9," ISO/IEC JTC1/SC29/WG7, N0011, 2020.

Huang et al, "OctSqueeze: Octree-Structured Entropy Model for LiDAR Compression", Proceedings of the IEEE/CVF Conference on Computer Vision and Pattern Recognition. 2020.

Huang et al, "DeepPrimitive: Image decomposition by layered primitive detection," Computational Visual Media 4.4 (2018): 385-397.

Tulsiani et al., "Learning shape abstractions by assembling volumetric primitives", Proceedings of the IEEE Conference on Computer Vision and Pattern Recognition. 2017.

Qi et al., "PointNet: Deep learning on point sets for 3D classification and segmentation," in proc. IEEE Conference on Computer Vision and Pattern Recognition, pp. 652-660, 2017.

Zou et al., "3D-PRNN: Generating shape primitives with recurrent neural networks", Proceedings of the IEEE International Conference on Computer Vision. 2017.

Yang et al., "FoldingNet: Point Cloud Auto-Encoder via Deep Grid Deformation", arXiv:1712.07262v2, Apr. 3, 2018, pp. 1-14.

Li et al., "Primitive fitting using deep boundary aware geometric segmentation", arXiv preprint arXiv:1810.01604 (2018).

Eldar et al., "The Farthest point strategy for progressive image sampling," IEEE Trans. on Image Processing, vol. 6, No. 9, pp. 1306-1315, 1997.

Meagher, "Geometric modeling using octree encoding," Computer graphics and image processing 19.2 (1982): 129-147.

Chen et al., "Bsp-net: Generating compact meshes via binary space partitioning", Proceedings of the IEEE/CVF Conference on Computer Vision and Pattern Recognition. 2020.

Quach et al., "Improved deep point cloud geometry compression", 2020 IEEE 22nd International Workshop on Multimedia Signal Processing (MMSP). IEEE, 2020.

Chen, et al., "Fast resampling of three-dimensional point clouds via graphs", IEEE Transactions on Signal Processing 66.3 (2017): 666-681.

Ballé, et al., "Variational image compression with a scale hyperprior", In ICLR (The International Conference on Learning Representations) 2018.

Dovrat et al., "Learning to sample", Proceedings of the IEEE Conference on Computer Vision and Pattern Recognition. 2019.

Li, et al., "Supervised fitting of geometric primitives to 3D point clouds", Proceedings of the IEEE Conference on Computer Vision and Pattern Recognition. 2019.

Li, et al., "Grass: Generative recursive autoencoders for shape structures" ACM Transactions on Graphics (TOG) 36.4 (2017): 1-14.

* cited by examiner

LEARNING-BASED POINT CLOUD COMPRESSION VIA TEARING TRANSFORM

CROSS REFERENCE TO RELATED APPLICATIONS

This application is a U.S. National Stage Application under 35 U.S.C. 371 of International Patent Application No. PCT/US2022/026990, filed Apr. 29, 2022, which is incorporated herein by reference in its entirety.

This application claims the benefit of U.S. Provisional Patent Application No. 63/181,270 filed Apr. 29, 2021, which is incorporated herein by reference in its entirety.

TECHNICAL FIELD

The present embodiments generally relate to a method and an apparatus for point cloud compression and processing.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever and is expected to be an ultimate enabler in the applications discussed herein.

SUMMARY

According to an embodiment, a method for decoding point cloud data is provided, comprising: accessing a codeword that provides a representation of a point cloud; accessing a grid image that provides refinement information to said representation of said point cloud; and reconstructing said point cloud responsive to said decoded codeword and said decoded grid image, using a neural network-based module.

According to another embodiment, an apparatus for decoding point cloud data is presented, comprising one or more processors, wherein said one or more processors are configured to: access a codeword that provides a representation of a point cloud; access a grid image that provides refinement information to said representation of said point cloud; and reconstruct said point cloud responsive to said decoded codeword and said decoded grid image, using a neural network-based module. The apparatus may further include at least one memory coupled to said said more or more processors.

According to another embodiment, a method for encoding point cloud data is provided, comprising: generating a codeword, by a first neural network-based module, that provides a representation of an input point cloud associated with said point cloud data; reconstructing a first point cloud, by a second neural network-based module, based on said codeword and a grid image; and adjusting said grid image to generate another grid image, by a third neural network-based module, based on said first reconstructed point cloud, said codeword, and said input point cloud.

According to another embodiment, an apparatus for encoding point cloud data is presented, comprising one or more processors, wherein said one or more processors are configured to: generate a codeword, by a first neural network-based module, that provides a representation of an input point cloud associated with said point cloud data; reconstruct a first point cloud, by a second neural network-based module, based on said codeword and a grid image; and adjust said grid image to generate another grid image, by a third neural network-based module, based on said first reconstructed point cloud, said codeword, and said input point cloud. The apparatus may further include at least one memory coupled to said more or more processors.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding point cloud data according to the methods described above.

One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
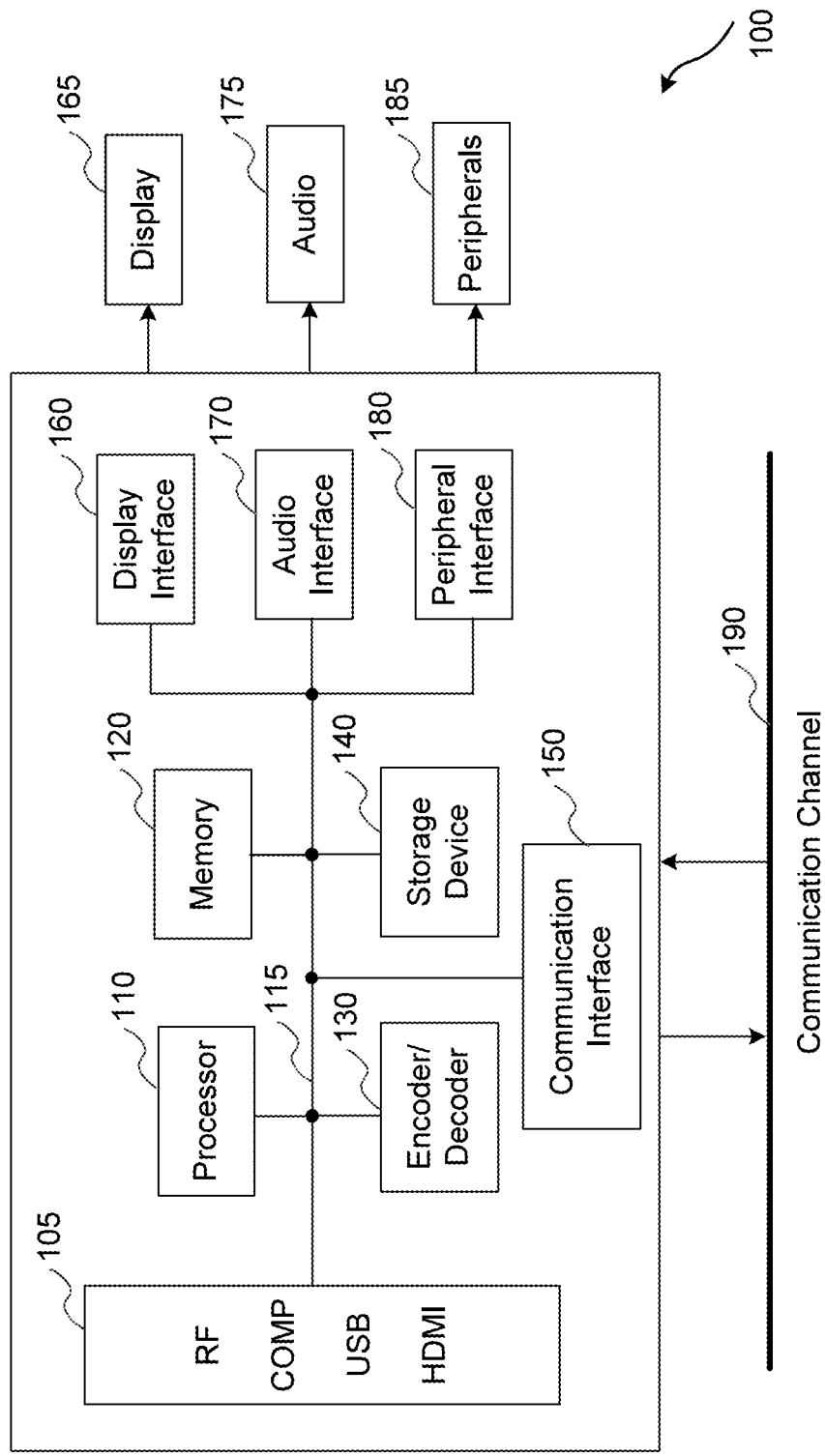
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

It is contemplated that point cloud data may consume a large portion of network traffic, e.g., among connected cars over 5G network, and immersive communications (VR/AR). Efficient representation formats are necessary for point cloud understanding and communication. In particular, raw point cloud data need to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds are foreseen by many as the future of 2D flat video. For VR and immersive worlds, a viewer is immersed in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. The point cloud for use in VR may be static or dynamic and are typically of average size, for example, no more than millions of points at a time.

Point clouds may also be used for various purposes such as culture heritage/buildings in which objects like statues or buildings are scanned in 3D in order to share the spatial configuration of the object without sending or visiting the object. Also, point clouds may also be used to ensure preservation of the knowledge of the object in case the object may be destroyed, for instance, a temple by an earthquake. Such point clouds are typically static, colored, and huge.

Another use case is in topography and cartography in which using 3D representations, maps are not limited to the plane and may include the relief. Google Maps is a good example of 3D maps but uses meshes instead of point clouds. Nevertheless, point clouds may be a suitable data format for 3D maps and such point clouds are typically static, colored, and huge.

World modeling and sensing via point clouds could be a useful technology to allow machines to gain knowledge about the 3D world around them for the applications discussed herein.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

In order to perform processing or inference on a point cloud, efficient storage methodologies are needed. To store and process an input point cloud with affordable computational cost, one solution is to down-sample the point cloud first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression. Better entropy models result in a smaller bitstream and hence more efficient compression. Additionally, the entropy models can also be paired with downstream tasks which allow the entropy encoder to maintain the task-specific information while compressing.

In addition to lossless coding, many scenarios seek lossy coding for significantly improved compression ratio while maintaining the induced distortion under certain quality levels.

Point cloud compression (PCC) refers to the problem of succinctly representing the surface manifold of the object(s) contained within a point cloud. Several fronts in regards to point cloud compression have been explored and can broadly be categorized into the following categories: PCC in the input domain, PCC in the primitive domain, PCC in the transform domain, and finally PCC via entropy coding. PCC in the input domain refers to downsampling the raw point cloud by choosing or generating novel key points that are representative of the underlying surface manifold. Although several learned (deep learning-based) and classical machine learning techniques exist in this area, many PCCs in the input domain are only suitable for dense point clouds as the network is restricted to do regular convolution. For PCC in the primitive domain, key points primitives (regular geometric 2D/3D shapes) are generated that aim to closely follow the underlying object manifold. PCC in the transform domain refers to the case when the raw point cloud data is first transformed into another domain via classical methods and then the transformed representation in the new domain is compressed to obtain more efficient compression. Though some work can be interpreted as transformation, it is non-trivial to have them been applied for a compression system. Finally, in the case of PCC via entropy coding, either the raw point cloud data or another (trivially obtained) representation of the point cloud is entropy coded via either adaptive learning-based or classical methods.

The present application relates to the learnable transform-based PCC. Existing learning-based PCC system via transform works for dense point cloud, but typically fails on sparse point clouds, for example, LiDAR point clouds.

TearingNet

TearingNet was developed in context of high-level computer vision problems, e.g., classification/segmentation, via unsupervised learning framework autoencoder.

Figure 2:
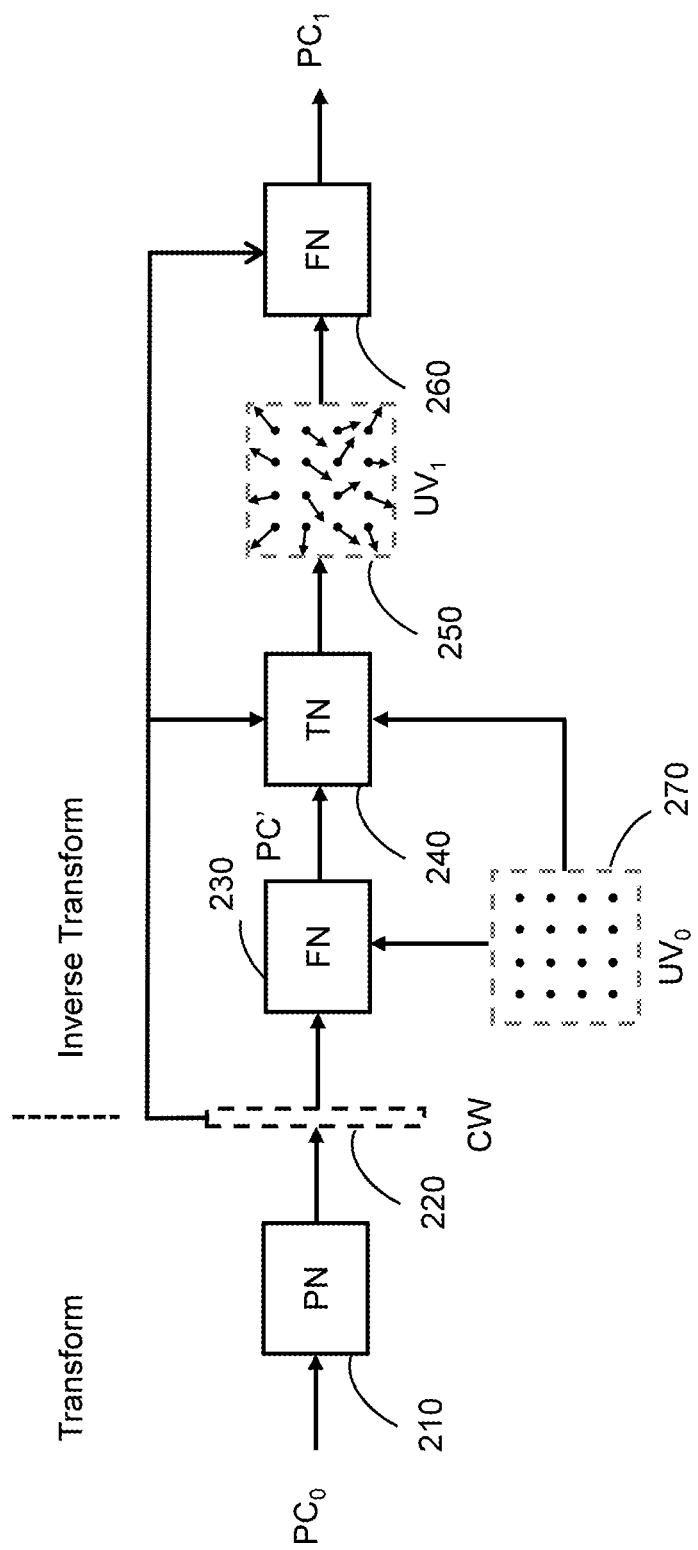
FIG. 2 illustrates a simplified TearingNet diagram.

FIG. 2 illustrates a simplified diagram of TearingNet to highlight that the transformer (encoder) and the inverse transformer (decoder) talk to each other via the codeword CW. Note that we intentionally renamed the encoder/decoder in the autoencoder as "transformer"/"inverse transformer" to align the terms to the context of compression.

The 2D grid image in TearingNet is introduced and updated within the inverse transformer (decoder). The 2D grid image is defined based on a 2D sampling grid at a certain resolution. In one embodiment, the two channels (u, v) in the grid image represents coordinates in the 2D space. In another embodiment, they represent the coordinate offsets with respect to their default positions in the 2D space. The 2D grid image contains N=W×H grid points, where W and H are the width and height of the grid image. The grid points in the grid image may be uniformly distributed, or non-uniformly distributed (e.g., randomly distributed). The 2D grid image intends to discover the topology information from the codeword via a neural network architecture. Note that the neural network has no access to the raw input point cloud.

From the input point cloud $PC_0$ (M points), a transforming module PN (210) generates a codeword CW (220) in a latent space. Here, a latent space refers to an abstract multi-dimensional space containing feature values, and the codeword CW is a feature vector representing the point cloud. Typically, the codeword can provide a high-level description or a rough representation of the point cloud.

An inverse transforming process is composed of two FN modules (230, 260) and a TN module (240). The FN module is used to reconstruct the point cloud from the codeword and the 2D grid image. The first invoke of FN module (230) takes a default 2D grid image (270, $UV_0$) as input in addition to the codeword CW. The second invoke of FN module (260) takes a modified 2D grid (250, $UV_1$) based on the 2D grid image as well as codeword CW as input. The point cloud output from the FN module ($PC'$, $PC_1$) contains N points, where N is not necessarily equal to M. In one embodiment, the two FN modules (230, 260) share the same weights. In FIG. 2, the 2D grid image has a square shape. More generally, the 2D grid image can take other shapes, such as a 2D sphere or 2D rectangle. The grid points can also be 3D grid points rather than 2D grid points in a 2D image.

The TN module generates an updated grid image (250, $UV_1$) that represents a modified 2D grid. The TN module takes the default 2D grid (250, $UV_0$), codeword CW as well as the output from the first invoke of FN as input. Each pixel in the grid image has a pair of values ($\Delta u$ and $\Delta v$) indicating a shift of an associated 2D point. The modification in the 2D grid can be used to refine reconstructed point locations. Therefore, because the second invoke of the FN module uses the updated 2D grid as input, the second invoke of FN may reconstruct a more accurate point cloud than the first invoke of FN.

With such a decoding architecture, TearingNet transformer (PN) is able to generate a codeword that has a better representability for complex object shapes via an end-to-end training.

Proposed Transformation: TearingTransform

The design of TearingNet is to promote the high-level representability of codeword CW, and it is hard to let a decoder to reconstruct fine details in point clouds from the codeword CW. Hence, only compressing the codeword CW from TearingNet to represent the original point cloud may only reconstruct a rough shape of the original point cloud, while point-to-point distortion between the original and reconstructed point clouds may be high, and thus does not provide good point cloud compression.

Figure 3:
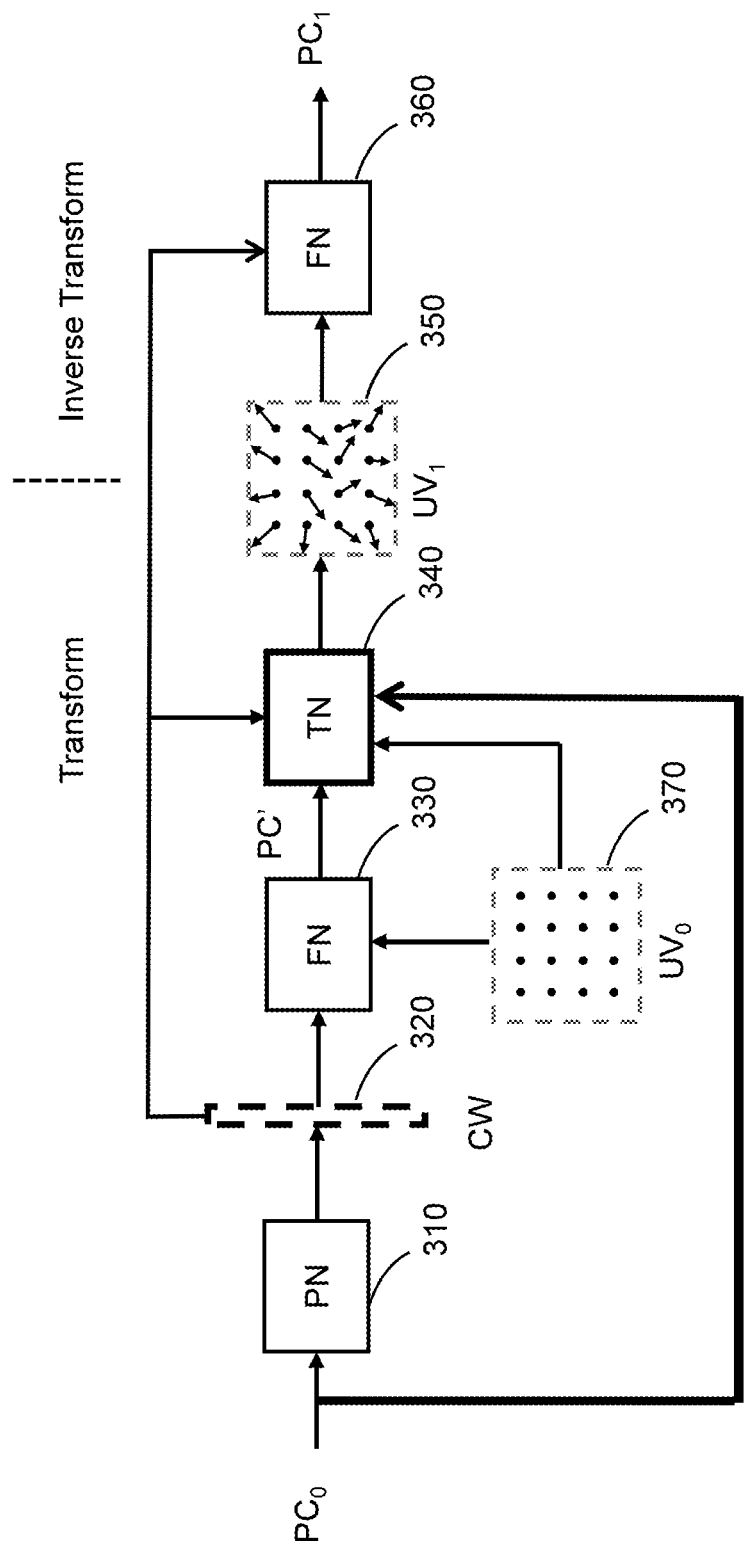
FIG. 3 illustrates a proposed diagram for TearingTransform, according to an embodiment.

To address this challenge, i.e., to ensure the reconstruction of fine details in point clouds, TearingTransform is proposed, which uses a different structure based on TearingNet, as shown in FIG. 3.

As the codeword CW cannot sufficiently represent the details in point clouds, it is proposed to allow a 2D grid image to be an extra input to the inverse transform (decoding). As in the TearingNet illustrated in FIG. 2, the grid points in the grid image are still used to indicate positions of the grid points. However, different from how the grid image is used in the TearingNet, the 2D grid image now intends to reveal finer geometry details in the input point cloud. In TearingTransform, the inverse transform (decoding) is only composed by a single FN module (360) and the forward transform (encoding) is composed of three modules PN (310), FN (330) and TN (340). The inverse transform (decoding) FN is embedded in the forward transform (encoding) process.

Furthermore, the new 2D grid image is generated by a new TN module (340), which is proposed to accept the input point cloud $PC_0$ as an additional input. The input point cloud was unavailable to the TN module in the context of TearingNet, as it belongs to the decoding process in TearingNet.

Now that the TN module is part of the forward transform (encoding), the TN module has access to the input point cloud. The newly introduced input would allow the TN module in TearingTransform to serve a different goal as in TearingNet, that is, to help the decoding to recover fine structural details in the point clouds.

Specifically, the forward transform (encoding) operates as follows as shown in FIG. 3. A PN module (310) takes input point cloud $PC_0$ as input, and generates a codeword CW (320). Then the codeword CW and a default grid image $UV_0$ (370, 2D grid) is fed to a FN module (330) that outputs a preliminary reconstruction of point cloud PC'. The TN module (340) then takes the default grid image, PC', $PC_0$ and CW as inputs, and generates an updated grid image $UV_1$ (350) as output. Finally, the forward transform of TearingTransform outputs the CW and the updated grid image. Note that the same structure in the TearingNet in FIG. 2 can be used here for the PN and FN. However, because the TN now takes the additional input $PC_0$, the structure for the TN used here will be different from the structure for the TN in FIG. 2.

The inverse transform (decoding) operate as follows. The FN module (360) takes a codeword CW and a grid image as input and reconstructs a point cloud $PC_1$ as output.

Therefore, with TearingTransform, a point cloud is decomposed into codeword CW and a grid image. The codeword CW is used to reconstruct the basic shape of the point cloud, and CW can be viewed as a low-rank component representing the underlying geometry. The grid image is to reconstruct fine details in the point cloud, and the grid image can be viewed as a sparse component representing the point sampling pattern.

Proposed Network Architecture for PN in TearingTransform

Figure 4:
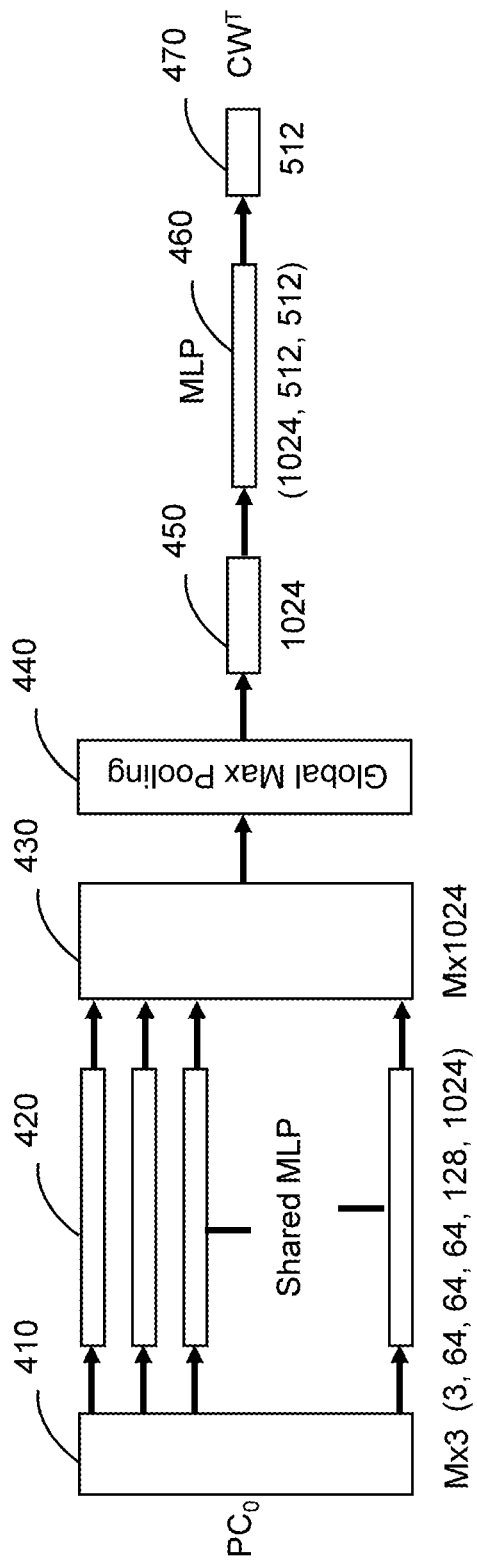
FIG. 4 illustrates an example of network architecture design for the PN module, according to an embodiment.

FIG. 4 illustrates an example of the detailed architecture of the PN module, which takes the input point cloud $PC_0$ (410) as input and outputs the (transpose of the) codeword CW (470) in the latent space. In particular, the input point cloud $PC_0$ contains M points, and each point P is represented by its 3D position $(x_p, y_p, z_p)$. Additional attributes, such as color or normal, may be also included in the point cloud data. The PN module is composed of a set of shared MLPs (Multi-layer Perceptrons, 420). The perceptron is applied independently and in parallel on each 3D point (numbers in brackets indicate layer sizes). The output of the set of shared MLPs, point features (430, M×1024), are aggregated by the global max pooling operation (440), which extracts a global feature with a length 1024 (450). It is further processed with another set of MLP layers (460), leading to the output codeword CW with a length 512 (470).

Proposed Network Architecture for FN in TearingTransform

Figure 5:
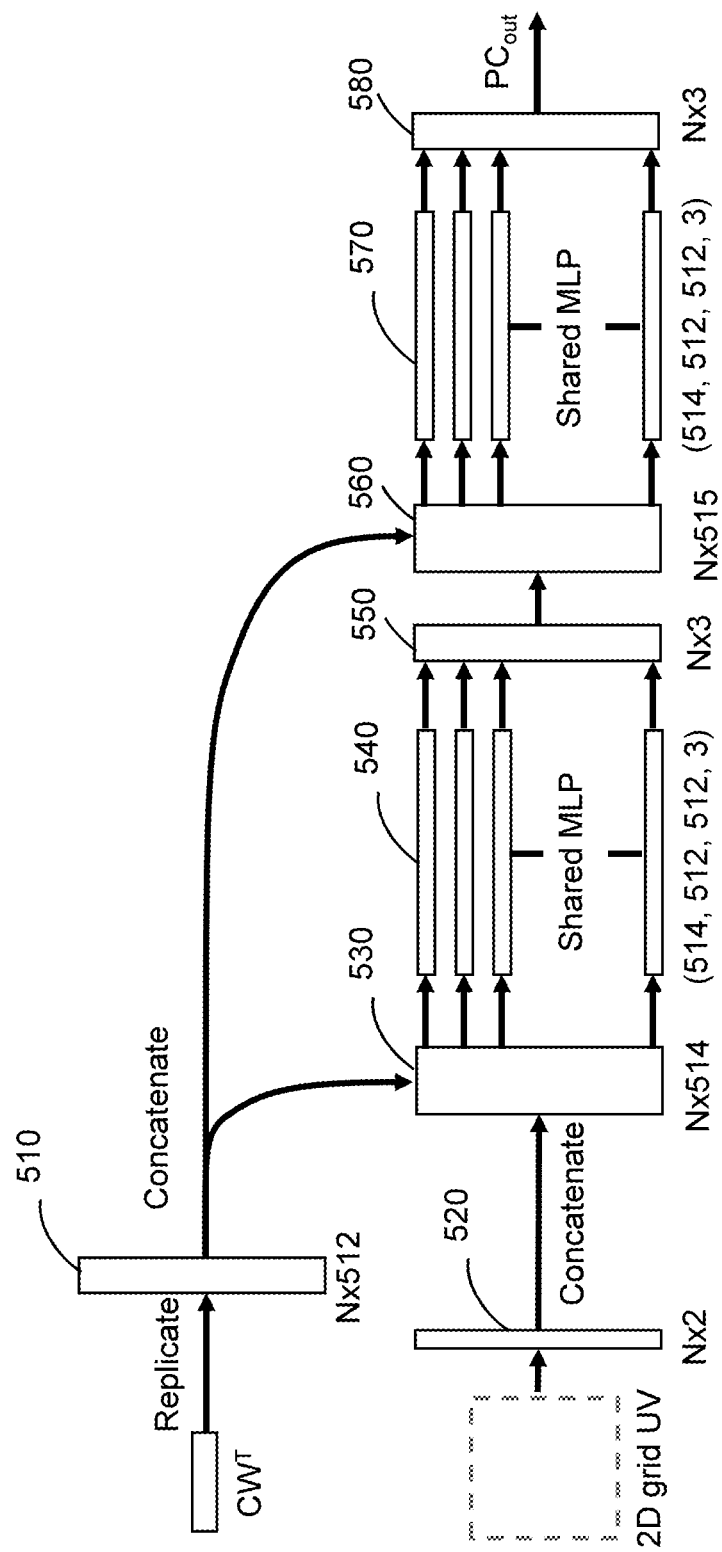
FIG. 5 illustrates an example of network architecture design for the FN module, according to an embodiment.

FIG. 5 illustrates an example of the detailed design of the FN module, which takes the codeword CW and the default 2D grid (UV) as input and outputs a reconstructed 3D point cloud $PC_{out}$. Here, the FN module is composed of two series of shared MLP layers (540, 570). The FN module can be seen as a 2D-to-3D mapping guided by the codeword, where the N grid points in the 2D grid image are mapped to the N points on the surface of the reconstructed point cloud.

The codeword is replicated N times and the resulting N×512 matrix (510) is concatenated with an N×2 matrix (520) that contains the N grid points in the 2D grid image. The result of the concatenation is a matrix of size N×514 (530), which is fed to the first series of shared MLP layers (540) to output a matrix of size N×3 (550). Then the replicated codewords are concatenated to the N×3 output (550) to form a matrix of size N×515 (560), which is fed into the second series of shared MLP layers (570). The final output $PC_{out}$ (580) is the reconstructed point cloud represented by N×3 matrix, where N is the number of points in the output point cloud $PC_{out}$.

Proposed Network Architecture for TN in TearingTransform

Figure 6:
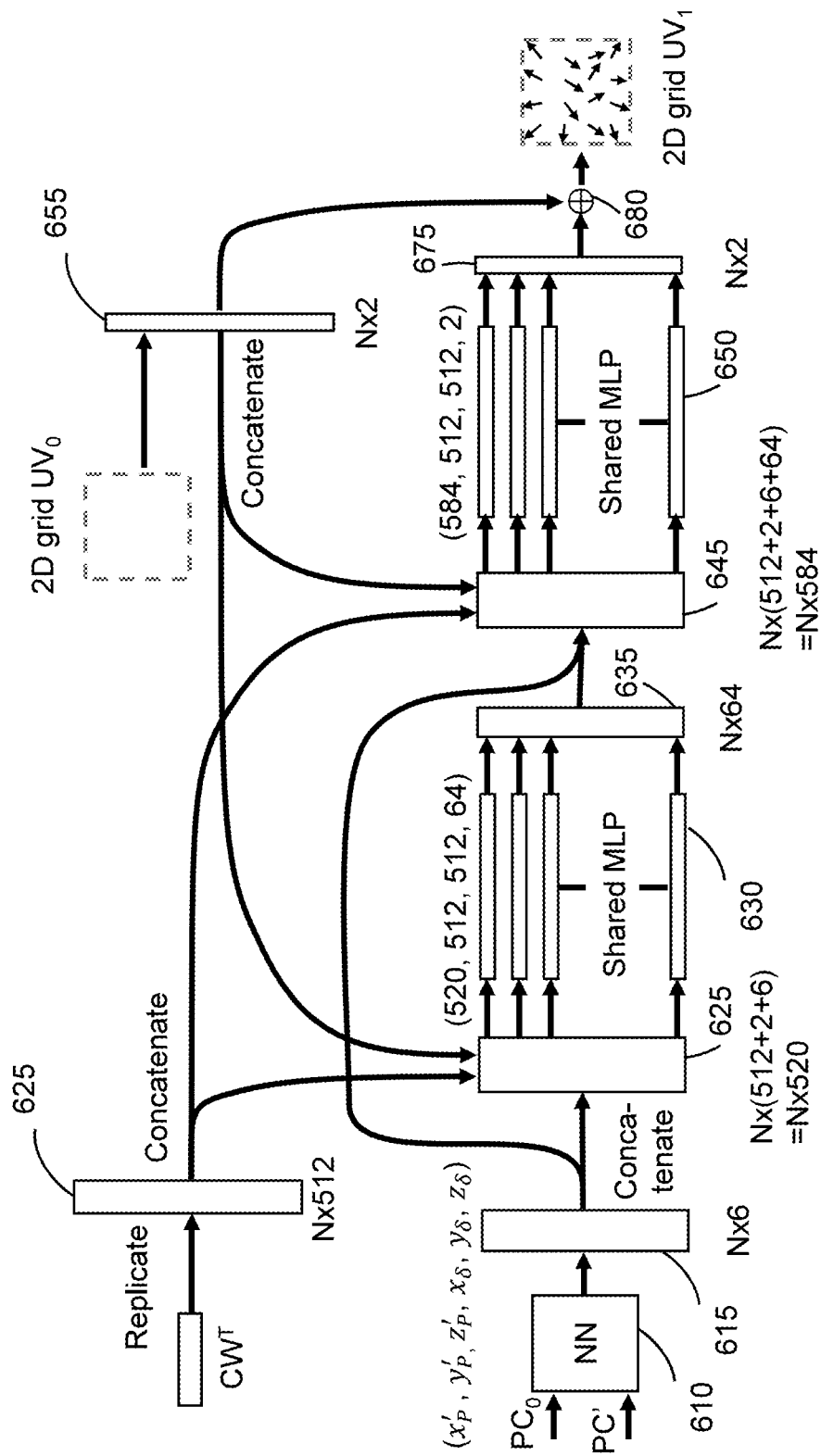
FIG. 6 illustrates an example of network architecture design for the TN module, according to an embodiment.

FIG. 6 illustrates an example of the detailed design of the TN module, according to an embodiment. In this embodiment, the TN module takes a (transposed) codeword CW, a 2D grid image, an original point cloud $PC_0$ and a preliminary reconstructed point cloud PC' as input, and outputs a modified grid image. The TN is composed of two sets of shared MLP layers (630, 650). That is, each time one point from PC' is fed as input to the TN module, it outputs one point in the modified grid image ($UV_1$). The TN module can be seen to learn point-wise modifications to the points in the 2D grid image to offset errors along the point cloud surface, in order to improve the point cloud reconstruction accuracy and ultimately to enhance the representability of the codeword.

Each point $P'=(x'_P, y'_P, z'_P)$ in PC' corresponds to a 2D point (u, v) in the 2D grid $UV_0$. In other words, points in PC' are indexed via (u, v). For each P', a corresponding point $P_0$ in input point cloud $PC_0$ can be identified via nearest neighbor searching or optimal assignment (e.g., using the NN module 610). An error between P' and $P_0$ is computed as $(x_\delta, y_\delta, z_\delta)$.

For each point, the codeword is replicated N times and the N×512 matrix (625) is concatenated with an N×6 matrix (615) that contains $(x'_P, y'_P, z'_P, x_\delta, y_\delta, z_\delta)$ and an N×2 matrix (655) that contains the N grid points in the 2D grid image. The result of the concatenation is a matrix of size N×520 (625), which is fed to the first series of shared MLP layers (630) to form an intermediate feature of size N×64 (635). Then the replicated codewords (625) are concatenated to N×6 matrix (615) that contains $(x'_P, y'_P, z'_P, x_\delta, y_\delta, z_\delta)$, the an intermediate feature (635), and N×2 matrix (655) that contains the N grid points to form a matrix of size N×584 (645), which is fed into the second series of shared MLP layers (650). The output is an N×2 matrix that contains point-wise modification (675) to the N points in the input 2D grid image. The point-wise modifications are added (680) to $UV_0$ to obtain the updated image $UV_1$.

In another implementation, the N×6 matrix (615) can contain $(x'_P, y'_P, z'_P, x, y, z)$ instead of $(x'_P, y'_P, z'_P, x_\delta, y_\delta, z_\delta)$, where (x, y, z) represent the absolute coordinate of point $P_0$ in $PC_0$. In yet another example, the N×6 matrix can include both the error $(x_\delta, y_\delta, z_\delta)$ and the absolute coordinates (x, y, z).

In the above, the examples of the PN, FN, and TN modules are described. It should be noted that these modules can use different network structures or configurations. For example, the MLP dimensions may be adjusted according to the complexity of practical scenarios, or more sets of MLPs can be used. Generally, any network structure that meets the input/output requirements can be used.

Regarding the network structure for TN module, convolutional neural network (CNN) layers may be used instead of MLP layers. In the above, the N points from the 2D grid (655) can naturally be arranged as an N'×N' 2D image of size N'×N'×2 where N' is the dimension of the square grid and N'×N'=N. Similarly, the N×512 matrix of the CW (625) can be arranged as N'×N'×512, and the N×6 matrix consists of $(x'_P, y'_P, z'_P, x_\delta, y_\delta, z_\delta)$ for every point (615) can be arranged as N'×N'×6. As a result, the N×520 matrix (625) now becomes a 3D volume of size N'×N'×520. Instead of using two series of MLP layers, in one embodiment, two series of 2D convolutional layers are used to consume the 3D volumes. In this embodiment, the first series of convolutional layers outputs a tensor of size N'×N'×64, instead of the original N×64 matrix (635). The input to the second series of convolutional layers now becomes a volume of size N'×N'×584, and the final output (UV$_1$) would become a volume of size N'×N'×2.

Enhanced TearingTransform

Figure 7:
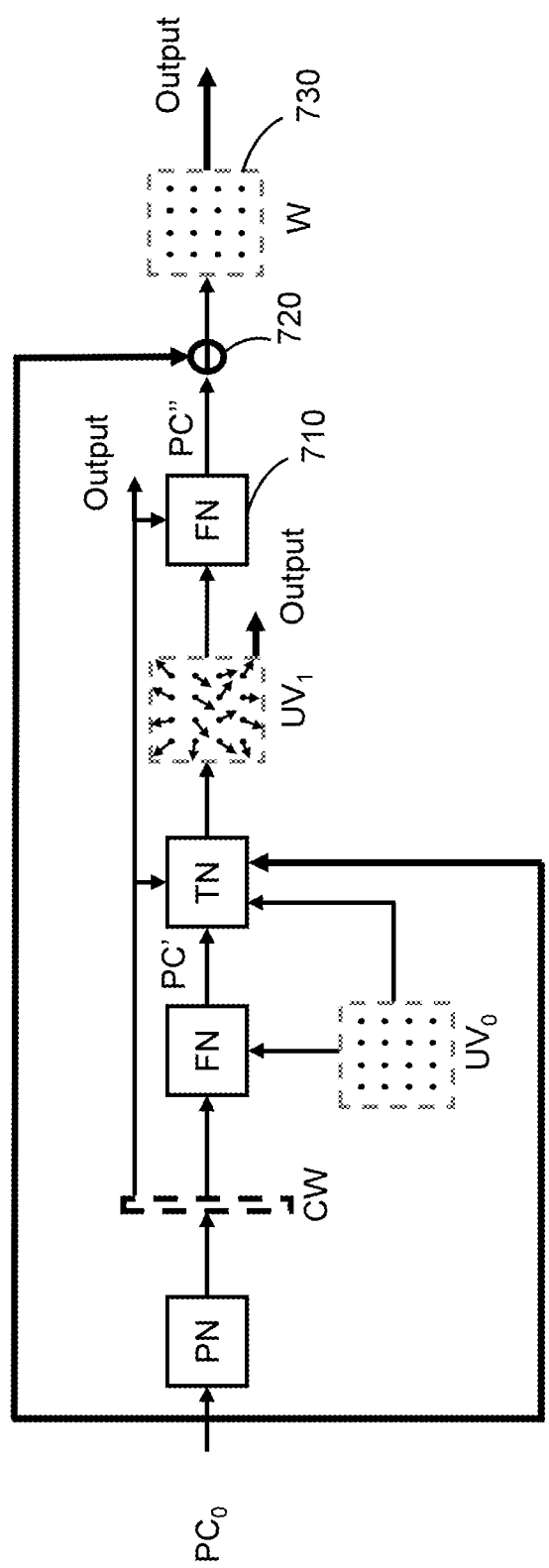
FIG. 7 illustrates forward transform of proposed enhanced TearingTransform, according to an embodiment.

In the previous example, the components (u, v) in the 2D grid image are able to offset errors along the surface, while incapable of handling the errors along the surface normal directions. In this embodiment, an enhanced TearingTransform is proposed, and FIG. 7 shows how the forward transform operates according to an embodiment. The codeword CW and grid image (UV$_1$) are generated as illustrated in FIG. 3, which are still the output of the forward transform. A second FN module (710) is inserted in the forward transform to generate another preliminary point cloud PC" based on UV$_1$.

For each point P''' in the preliminary reconstruction PC''', its corresponding point is additionally indexed in input point cloud PC$_0$, that is, the point pair is established at the beginning of the TN module. In particular, a nearest neighboring point P is identified from the input raw point cloud, for each point P''' in the preliminary reconstructed point cloud PC'''. A normal vector (D) can be computed for point P''' in PC'''. Then an error vector from point P''' to P is computed as (P-P''') and the error vector (P-P''') is projected along the normal vector to generate (720) an offset error along normal direction on point P'''. That is, (P-P''')*(D), where "*" is an inner production between two vectors. The length (W) of the projected error vector is output (730) for each point in the preliminary point cloud reconstruction PC'''.

The normal can be computed, for example, based on the mesh-like graph generated by TearingNet. Specifically, the mesh-like graph is first constructed in the original 2D grid using 4-nearest neighboring points. The graph appears as a mesh when the 2D grid points are mapped to the point cloud PC'''. Note that graph edges can be removed when they are moved far away from each other during the mapping. For a point P''' in the mesh-like graph, we identify a triangle on the mesh-like graph that P''' belongs to, then the normal of P''' is computed as the normal of the triangle.

Figure 8:
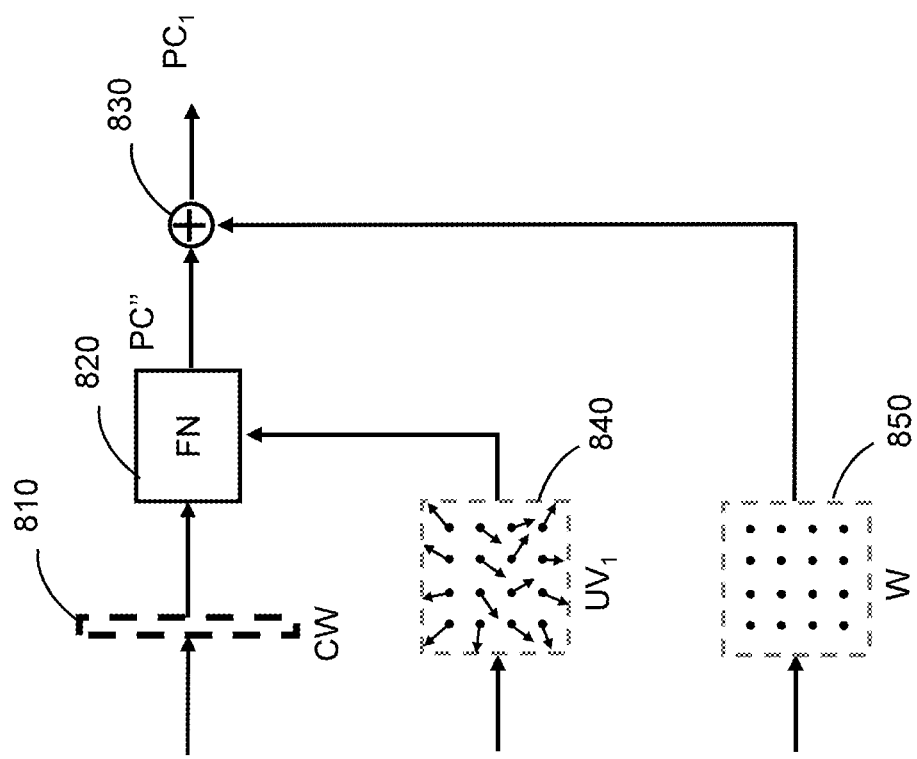
FIG. 8 illustrates inverse transform of proposed enhanced TearingTransform, according to an embodiment.

For inverse transform, as illustrated in FIG. 8, the codeword CW (810) and grid image UV$_1$ (840) are used to construct points P''' for a preliminary point cloud PC''' based on a FN module (820), and then it will be refined (830) by the offset error W along normal direction D (850). That is (P'''+D×W), where the normal vector D is computed for point P''' in PC'''.

In this embodiment, the codeword CW helps reconstructing a preliminary and smooth surface; the grid image intends to correct the point locations along the tangent plane, while W intends to make a correction along the normal direction.

Proposed Compression Framework: TearingCompression

Figure 9:
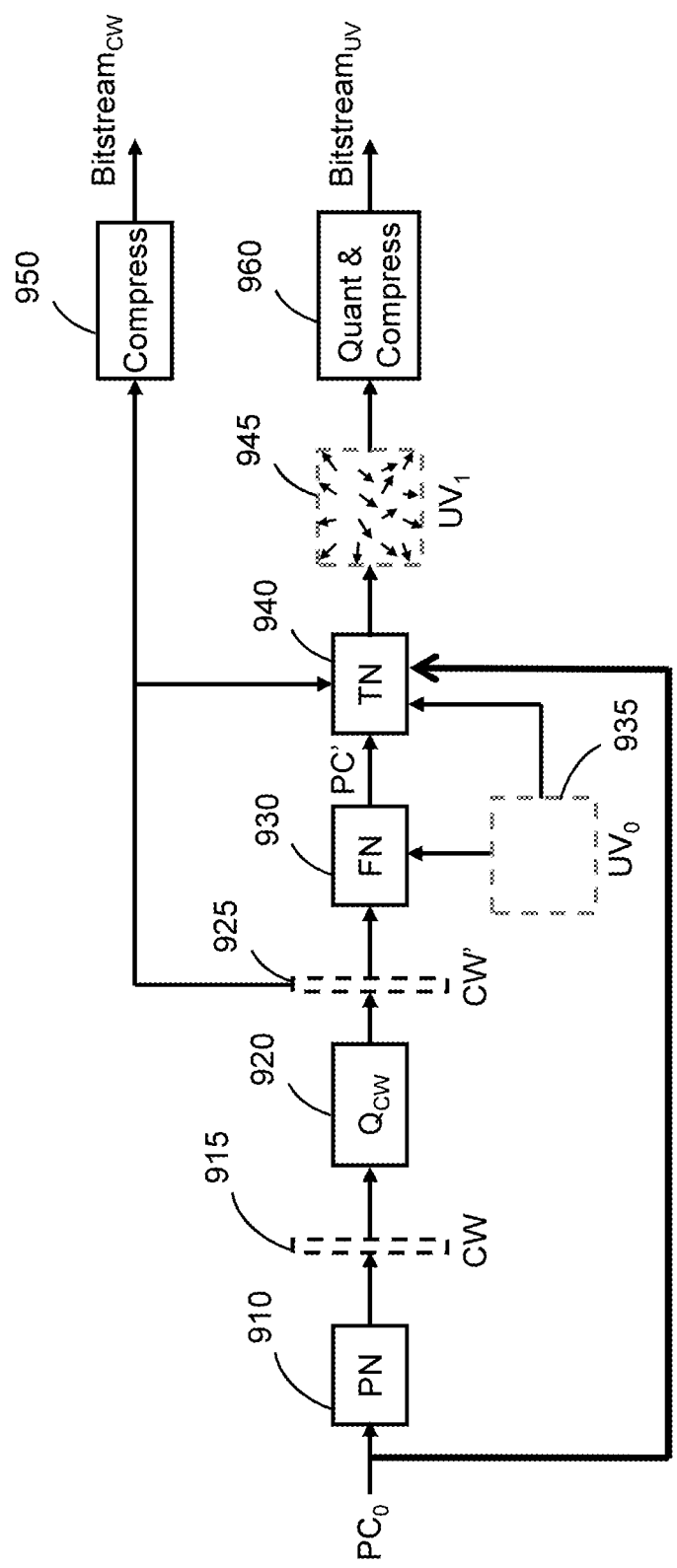
FIG. 9 illustrates a block diagram of a proposed TearingCompression encoder, according to an embodiment.

In this embodiment, it is proposed to apply TearingTransform in a learning-based point cloud compression system. FIG. 9 illustrates the overall diagram of a TearingCompression encoder, according to an embodiment. Comparing to the transform-only diagram that has a single output of reconstructed point clouds, TearingCompression in addition compresses the codeword CW and grid image into bitstreams. The PN module (910), FN module (930) and TN module (940) can use the same structure as the corresponding PN, FN, TN modules in the TearingTransform as illustrated in FIG. 7.

In the proposed compression system, a quantization step (920, Q$_{CW}$) is applied on the codeword CW (915) to obtain quantized coded word CW' (925), before it is fed to the FN module (930) during encoding. In one example, CW'=rounding(CW/QS), where QS is a selected quantization step. One of the motivations for the quantization is to have the input to the FN module be exactly matched between the encoding and the decoding stages.

Compression of codeword CW can be a neural network-based module (950), such as a variational autoencoder based on a factorized prior model, which approximates the quantization operation by adding uniform noise. It outputs a differentiable bitrate R$_{CW}$ for end-to-end training.

In one embodiment, the compression (960) on the grid image (945) can be based on state-of-the-art image/video compression methods, e.g., JPEG, MPEG AVC/HIEVC/VVC. Quantization (960) is performed before compression, for example, in order to convert the floating numbers in the grid image to a data format used by the 2D video encoder. In another embodiment, the compression (960) can be neural network-based methods, such as a variational autoencoder based on a factorized prior model or a scale hyperprior model, which approximates the quantization operation by adding uniform noise. It outputs a differentiable bitrate R$_{UV}$ for end-to-end training.

In another embodiment, if UV is enhanced by UVW as in enhanced TearingTransform, channel W also needs to be compressed and transmitted. In one example, the W channel can be compressed in a similar manner like the 2D grid image.

Proposed TearingCompression Decoder

Figure 10:
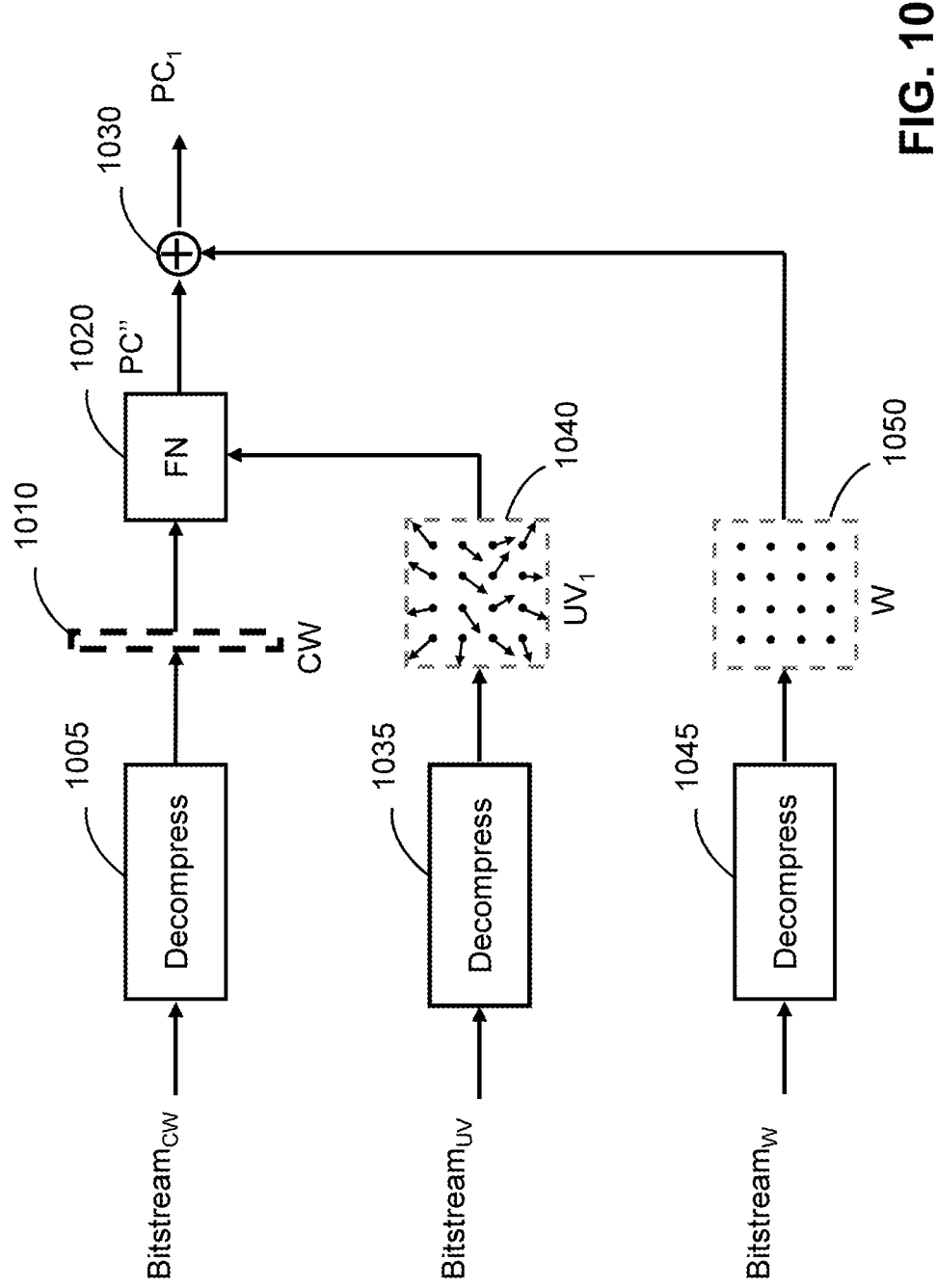
FIG. 10 illustrates a block diagram of a proposed TearingCompression decoder, according to an embodiment.

FIG. 10 illustrates a diagram for a decoder, according to an embodiment. The inputs to the decoder are the bitstreams generated by the encoder based on TearingCompression as illustrated in FIG. 9. The decoder first reconstructs (1005, 1035) CW (1010) and the grid image (1040) from the coded symbols, then fed codeword CW and grid image to the neural network-based inverse transform module FN module (1020) to reconstruct a point cloud (PC"). The decoder uses decompression methods that correspond to the compression methods used to generate the codeword CW and grid image. This decoding module FN takes input of both codeword CW and grid image to reconstruct the point cloud. Finally, the reconstructed point clouds are outputted.

If at the encoder side, channel W is compressed. Then the bitstream corresponding to the W channel is also de-compressed (1045) to reconstruct the W channel (1050). The point cloud PC" can be refined (1030) by W to generate the final output point cloud PC$_1$.

In the examples of FIG. 9 and FIG. 10, there are separate bitstreams for the codeword, the grid image, and the W image. It should be noted that some or all of these bitstreams may be multiplexed into a single bitstream.

Training

The TearingTransform as illustrated in FIG. 3 can be trained in a self-supervised manner as an autoencoder. In one embodiment, a loss function is defined based on an error metric between input point cloud PC$_0$ and output point cloud PC$_1$, e.g., chamfer distance (CD), or earth mover distance (EMD).

Figure 11:
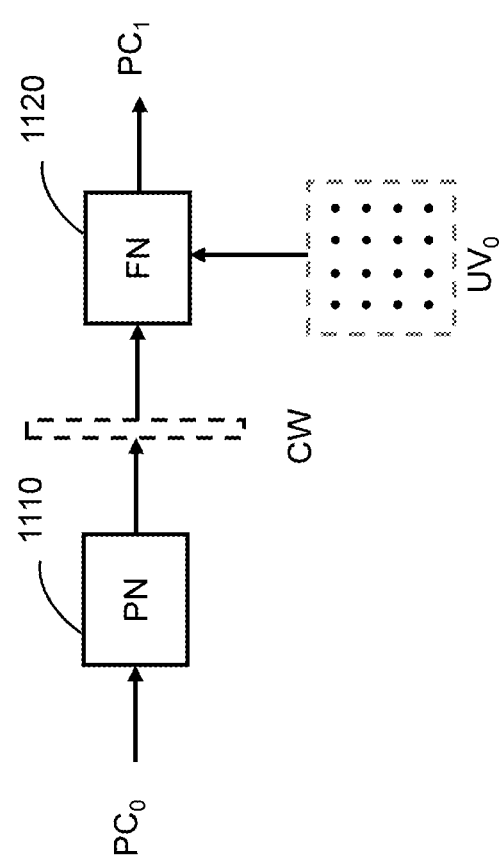
FIG. 11 illustrates a block diagram with the proposed PN and FN in a FoldingNet architecture, according to an embodiment.

In another embodiment, the training of the TearingTransform follows a two-stage strategy. In the first stage, the TN module is removed from the diagram, that let TearingTransform reduced to a FoldingNet diagram composing of only the PN module (1110) and FN module (1120) as shown in FIG. 11. The training of this FoldingNet diagram is to provide an initial weight parameter set for PN module and FN module. During the training, the loss function is based on an augmented chamfer distance (CD):

$$d_{PC_0, PC_1} = \max\left\{\frac{w_1}{M}\sum_{P_0 \in PC_0}\min_{P_1 \in PC_1}\|P_0 - P_1\|_2, \frac{w_2}{N}\sum_{P_1 \in PC_1}\min_{P_0 \in PC_0}\|P_0 - P_1\|_2\right\}$$

where we use a larger weighting factor $w_1$ for the first term, and a smaller weighting factor $w_2$ for the second term.

In the second stage, the network parameters for PN and FN are preloaded into TearingTransform. Then the end-to-end training of TearingTransform is performed using the original chamfer distance function, i.e., both $w_1$ and $w_2$ equal to 1.

In another embodiment that may be more computation efficient, as the point pairs between reconstruction points and input raw point cloud have been established during the nearest neighbor search in the TN component, the loss function can then be defined as a point-wise error between input point cloud $PC_0$ and output point cloud $PC_1$.

The training steps for TearingTransform can be directly applied to the enhanced TearingTransform without modifications.

Figure 12:
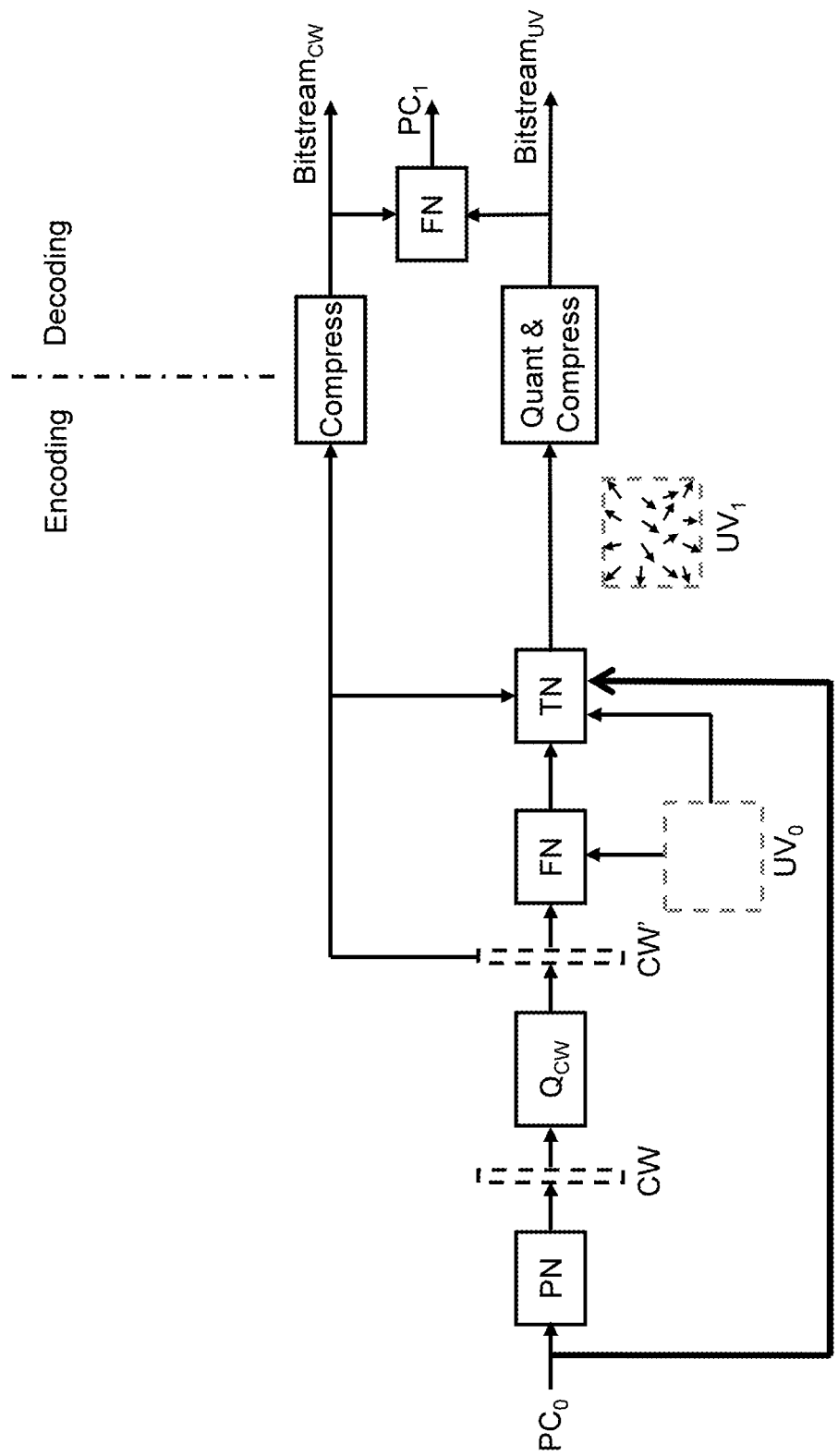
FIG. 12 illustrates a block diagram for a compression system, according to an embodiment.

The training methods of TearingTransform could be extended as follows to train TearingCompression system in FIG. 12, which includes the encoder as shown in FIG. 9 (assuming no coding of W) and decoder in FIG. 10. Comparing to TearingTransform, TearingCompression has extra heads that output bitstreams in addition to output point clouds. Hence, when we extend the two-stage strategy for TearingCompression, the following steps apply.

In the first stage, the FoldingNet diagram is first trained in the way described earlier. In the second stage, end-to-end training on TearingCompression will be conducted. The PN and FN modules are loaded with the parameters learned from the first stage. The reconstruction quality, measured by the chamfer distance, is regularized by the bitrate of the two bitstreams, as described below:

$$\text{loss} = d_{PC_0, PC_1} + \lambda R_{CW} + \mu R_{UV}$$

where $R_{CW}$ and $R_{UV}$ are bitrates of the codeword CW and the grid image, respectively, $\lambda$ and $\mu$ are regularization parameters.

Coding for Machine

Figure 13:
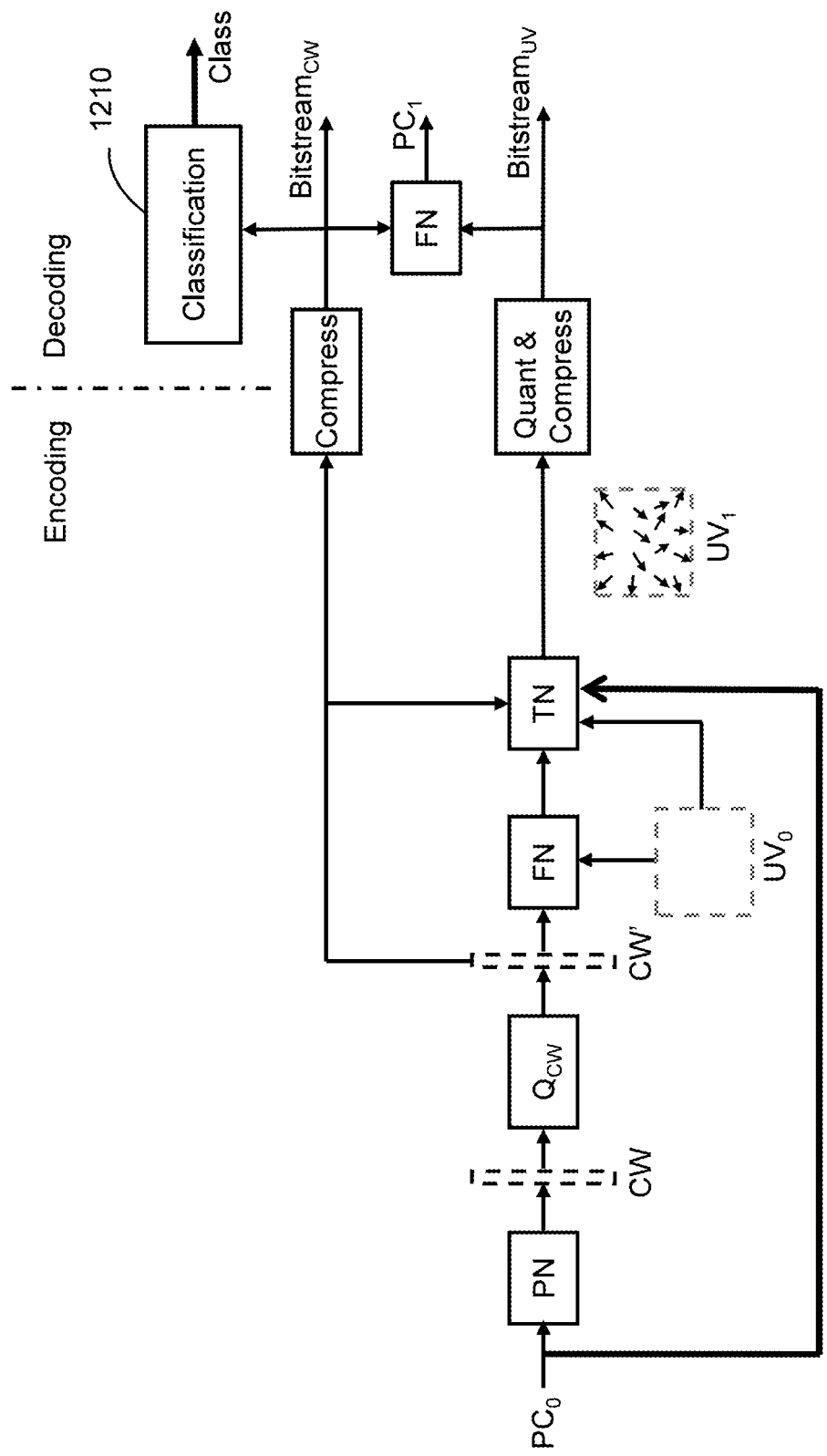
FIG. 13 illustrates a block diagram for a compression system for machine, according to an embodiment.

Often a point cloud is not solely to be viewed by human eyes, but also for machine-oriented tasks, e.g., classification, segmentation, etc. In such scenarios, it should be pointed out that the codeword CW should serve a role as high-level description of the point cloud in addition to reconstructing a preliminary point cloud. The grid image still counts for the fine details in the point cloud. Such dual roles of the codeword CW allow a tradeoff between the need of human perception and machine tasks. For example, the codeword CW may be fed to a downstream task, like classification (1310) as shown in FIG. 13. This additional head provides an extra supervision for a tradeoff between coding and classification.

In another embodiment, the PN module may select a different architecture to favor the downstream vision task. Via training, the TN module would have an updated set of parameters to compensate the newly introduced bias in codeword CW.

In the above embodiments, the input point cloud to be transformed/encoded is a full point cloud frame. In another embodiment, it is proposed to first partition full point cloud frames into smaller point cloud blocks. Then the point cloud blocks are fed to the proposed TearingTransform or TearingCompression as inputs to limit the complexity required to process the input point clouds.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding point cloud data, comprising:
    decoding, from at least a bitstream, a codeword that provides a representation of a point cloud;
    decoding, from said at least a bitstream, a grid image that provides refinement information to said representation of said point cloud; and
    reconstructing said point cloud based on said decoded codeword and said decoded grid image, using a neural network-based module, wherein said neural network-based module includes at least a first set of layers and a second set of layers, wherein said first set of layers is responsive to said decoded codeword and said decoded grid image, and wherein said second set of layers is responsive to output of said first set of layers and said decoded codeword.

2. The method of claim 1, wherein said first set of layers corresponds to a first set of shared Multi-Layer Perceptrons (MLPs) and said second set of layers corresponds to a second set of shared MLPs.

3. The method of claim 1, wherein said grid image includes a set of pixels, each pixel in said grid image includes two channels indicating a 2D position.

4. A method for encoding point cloud data, comprising:
    generating a codeword, by a first neural network-based module, that provides a representation of an input point cloud associated with said point cloud data;
    reconstructing a first point cloud, by a second neural network-based module, based on said codeword and a grid image, wherein said second neural network-based module includes at least a first set of layers and a second set of layers, wherein said first set of layers is responsive to said codeword and said grid image, and wherein said second set of layers is responsive to output of said first set of layers and said codeword;
    adjusting said grid image to generate another grid image, by a third neural network-based module, based on said first reconstructed point cloud, said codeword, and said input point cloud;
    compressing said codeword;
    compressing said another grid image; and
    generating at least a bitstream including said compressed codeword and said compressed another grid image wherein said compressed another grid image is to be used to refine said representation of said input point cloud during decoding.

5. The method of claim 4, wherein said grid image includes a set of pixels, each pixel in said grid image includes two channels indicating a 2D position.

6. The method of claim 4, further comprising:
    obtaining, by said third neural network-based module, for each point P' in said first reconstructed point cloud, a corresponding point $P_0$ in said input point cloud; and
    obtaining an error between P' and $P_0$.

7. The method of claim 6, wherein said third neural network-based module includes at least a third set of layers and a fourth set of layers, wherein said third set of layers is responsive to said codeword, said grid image, and said error, and wherein said fourth set of layers is responsive to output of said third set of layers, said codeword, said grid image, and said error.

8. The method of claim 7, wherein said grid image is adjusted responsive to output of said fourth set of layers to form said another grid image.

9. An apparatus for decoding point cloud data, comprising one or more processors and at least one memory, wherein said one or more processors are configured to:
    decode, from at least a bitstream, a codeword that provides a representation of a point cloud;
    decode, from said at least a bitstream, a grid image that provides refinement information to said representation of said point cloud; and
    reconstruct said point cloud based on said decoded codeword and said decoded grid image, using a neural network-based module, wherein said neural network-based module includes at least a first set of layers and a second set of layers, wherein said first set of layers is responsive to said decoded codeword and said decoded grid image, and wherein said second set of layers is responsive to output of said first set of layers and said decoded codeword.

10. The apparatus of claim 9, wherein said grid image includes a set of pixels, each pixel in said grid image includes two channels indicating a 2D position.

11. An apparatus for encoding point cloud data, comprising one or more processors and at least one memory, wherein said one or more processors are configured to:
    generate a codeword, by a first neural network-based module, that provides a representation of an input point cloud associated with said point cloud data;
    reconstruct a first point cloud, by a second neural network-based module, based on said codeword and a grid image, wherein said second neural network-based module includes at least a first set of layers and a second set of layers, wherein said first set of layers is responsive to said codeword and said grid image, and wherein said second set of layers is responsive to output of said first set of layers and said codeword;
    adjust said grid image to generate another grid image, by a third neural network-based module, based on said first reconstructed point cloud, said codeword, and said input point cloud;
    compress said codeword;
    compress said another grid image; and
    generate at least a bitstream including said compressed codeword and said compressed another grid image wherein said compressed another grid image is to be used to refine said representation of said input point cloud during decoding.

12. The apparatus of claim 11, wherein said grid image includes a set of pixels, each pixel in said grid image includes two channels indicating a 2D position.

13. The apparatus of claim 11, wherein said one or more processors are further configured to:
- obtain, by said third neural network-based module, for each point P' in said first reconstructed point cloud, a corresponding point $P_0$ in said input point cloud; and
- obtain an error between P' and $P_0$.

14. The apparatus of claim 13, wherein said third neural network-based module includes at least a third set of layers and a fourth set of layers, wherein said third set of layers is responsive to said codeword, said grid image, and said error, and wherein said fourth set of layers is responsive to output of said third set of layers, said codeword, said grid image, and said error.

15. The apparatus of claim 11, wherein said grid image is adjusted responsive to output of said fourth set of layers to form said another grid image.

16. The apparatus of claim 14, wherein said third set of layers correspond to a third set of shared MLPs and said fourth set of layers correspond to a fourth set of shared MLPs.

\* \* \* \* \*